Dec. 10, 1957  E. A. HILLE  2,815,566
WORK HOLDING STAND
Filed March 5, 1956  2 Sheets-Sheet 1
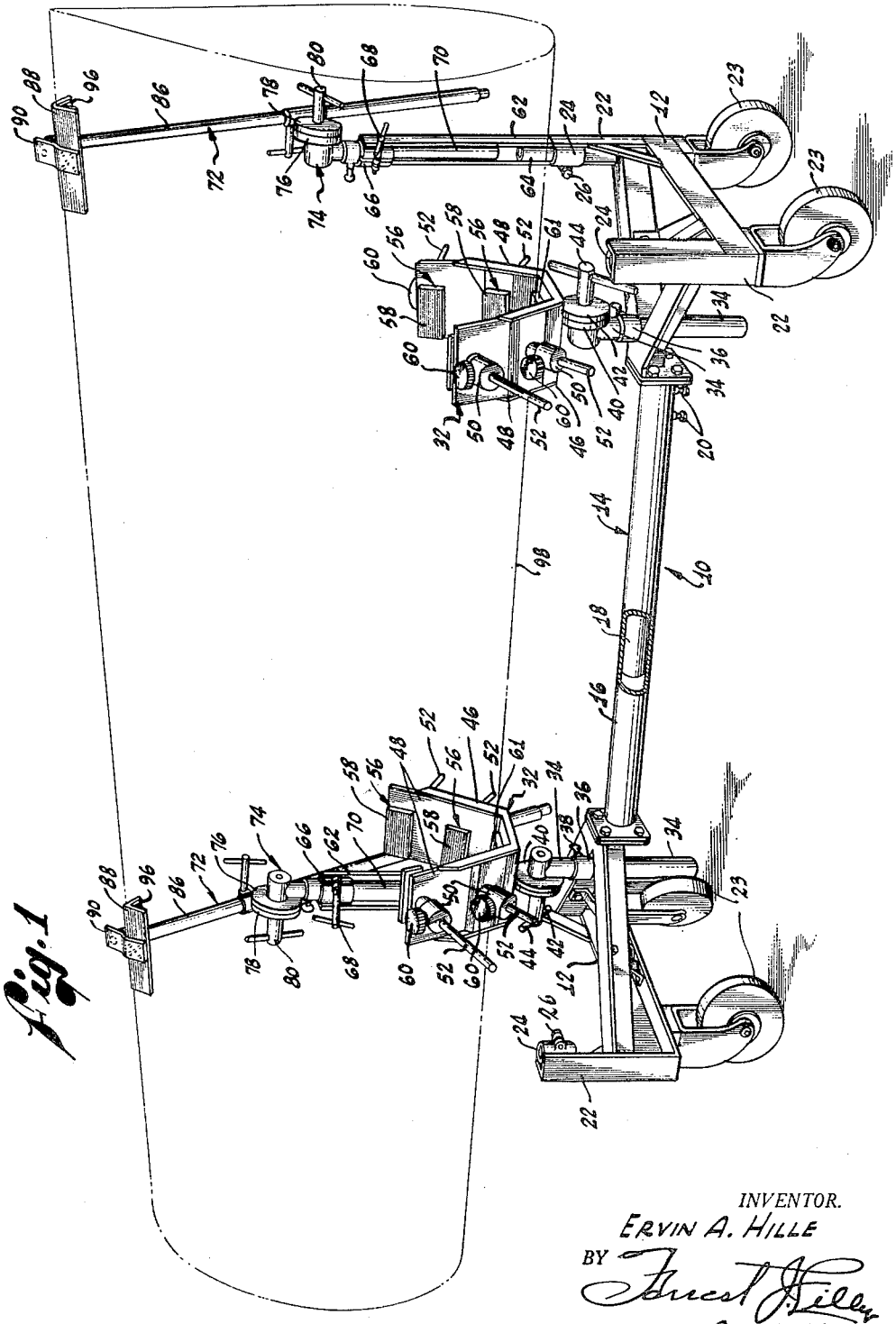
Fig.1
INVENTOR.
ERVIN A. HILLE
BY
ATTORNEY Dec. 10, 1957 E. A. HILLE 2,815,566
WORK HOLDING STAND
Filed March 5, 1956 2 Sheets-Sheet 2

INVENTOR.
ERVIN A. HILLE
BY
ATTORNEY

United States Patent Office 2,815,566
Patented Dec. 10, 1957

2,815,566

WORK HOLDING STAND

Ervin A. Hille, Glendale, Calif., assignor to Star Radiator Co., Los Angeles, Calif., a corporation of California Application March 5, 1956, Serial No. 569,521

4 Claims. (Cl. 29—288)

This invention relates to work holding stands and particularly to a stand for supporting aircraft sheet metal sections, and the like, in diverse working positions.

In the repair and construction of aircraft it is frequently necessary to perform operations on individual components thereof, such as wings, ailerons, rudders, and elevators. To enable efficient working on aircraft sections of this nature, it is necessary that they be rigidly supported without damage and that the work holding stand be adjustable to enable the section to be held in the most convenient position for the operation to be performed. The supporting stand must also permit easy access to the section.

The primary object of the invention is, accordingly, the provision of a new and improved work holding stand especially designed for supporting aircraft sheet metal sections and the like in convenient working position.

Another object of the invention is a provision of a work holding stand of a class described which is capable of firmly supporting an aircraft section in a desired working position without causing damage thereto.

Yet another object of the invention is the provision of a work holding stand of the class described having work-engaging members which are fully and easily adjustable to accommodate supporting of the section in diverse working positions so as to enable the section to be disposed in the position most convenient to the operation to be performed.

A further object of the invention is the provision of a work holding stand of the class described which is adjustable to accommodate the supporting of sheet metal sections of different sizes and configurations.

A still further object of the invention is the provision of a work holding stand of the class described which is so constructed as to provide substantially complete and easy access to the section supported thereby.

Yet a further object of the invention is the provision of a work holding stand of the class described which is relatively simple and inexpensive in construction, readily movable from one place to another, and otherwise especially suited to the purposes for which it is intended.

The invention may be best understood from the following detailed description taken in conjunction with the annexed drawings wherein:

Fig. 1 is a view, in perspective, of the present work holding stand;

Figure 2:
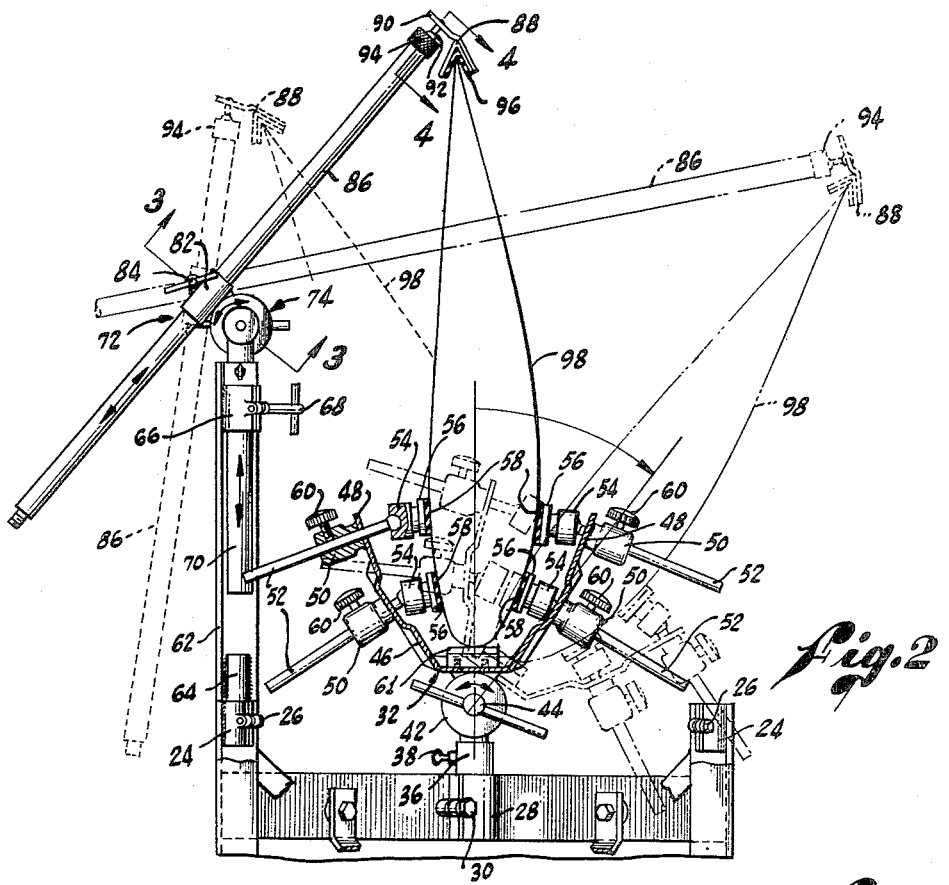
Fig. 2 is an end elevation, partially broken away, of the work holding stand in Fig. 1, the work-engaging elements thereof being illustrated in diverse work supporting positions.

Referring now to these drawings, the present work holding stand comprises a supporting frame 10, including a pair of generally triangular shaped end sections 12 and an extensible intermediate section 14 secured at opposite ends to apices of the end sections. The extensible section 14 includes an outer, elongated sleeve 16 fixed to one of the end sections 12 and an inner cylindrical rod 18 slidably received in the sleeve 16 and fixed to the other end sections 12. The arrangement is such that the effective length of the frame 10 may be varied by sliding the rod 18 into or out of the sleeve 16. Bolts 20 are threaded in the outer sleeve 16 for securing the rod 18 in a given axial position in the sleeve 16.

The end sections 12 are constructed of L-section channels rigidly joined in the triangular configuration shown, and include four upstanding channels or corner posts 22 at the corners of the frame 10. Casters 23, carried on the end sections 12, provide for rolling of the stand from one position to another in the shop.

Welded between the flanges of the corner post 22, at the upper ends of the latter, are split sleeves, or sockets, 24 which are provided with clamping screws 26 for drawing the portions of the sleeves together. An additional pair of split sleeves 28, Fig. 2, are welded to the frame end sections 12 at the aforesaid apices thereof, these latter sleeves forming additional sockets having clamping screws 30 for drawing the split portions thereof together. The axes of the several sockets 24 and 28 extend normal to the plane of the frame 10.

Indicated at 32 are a pair of lower work-engaging members carried on the frame 10 each including a cylindrical post 34 slidably received in one of the sockets 28 for vertical adjustment of the work engaging members 32 to accommodate workpieces, such as aircraft sheet metal sections, of diverse sizes and configurations. The posts 34 of the work-engaging members 32 are adapted to be retained in desired vertical position in the sockets 28 by threading of the clamp screws 30 to draw the portions of the latter sockets into clamping engagement with posts 34. Collars 34, slidable on the posts 34 and adapted to be fixed in a given position thereon by clamp screws 38 threaded in the collars, provide additional means for preventing downward movement of the posts 34 in the sockets 28 so as to assure retention of the work-engaging members 32 in the desired vertical position.

Carried at the upper end of each of the cylindrical posts 34 is an angularly adjustable clamp device including a stationary clamping plate 40 rigid on the upper end of the respective post 34 and a relatively movable clamp plate 42 adapted to be angularly adjusted relative to stationary clamp plate 40 and retained in angular adjusted position by means of a clamping screw 44, as will hereinafter be more fully explained. Rigidly secured to the periphery of the rotatable clamping plate 42 is a yoke-shaped frame 46 including upwardly diverging side walls 48 rigidly mounting on their outer surfaces pairs of bosses 50.

The walls 48 and bosses 50 of the yokes 46 have bores extending therethrough for slidably receiving stems 52 to the inner ends of which plates 56 are connected, by ball and socket couplings 54. These plates 56 have resilient work-engaging pads 58 secured to their inner surfaces for bearing against the surface of the work. Stems 52 are adapted to be clamped in adjusted position in the bosses 50 by means of clamping screws 60 so as to enable varying of the spacing between the plates on the opposite side walls of each yoke 46 in accordance with the thickness of the work to be supported. The yokes carry additional resilient work-engaging pads 61 at the apices thereof.

Indicated at 62 are a pair of corner post extensions comprising L-section channels having welded between their flanges, at one end thereof, cylindrical posts 64 which extend beyond the latter ends of the channels for receipt in the sockets 24 of the corner post 22 at one side of the frame 10, as shown. These cylindrical posts 64 may be firmly retained in the sockets 24 by threading of the clamping screws 26 to draw the portions of the latter sockets into frictional clamping engagement with the posts. Welded between the flanges of the channel 62, at the opposite ends of the latter, are split sockets 66, including clamping screws 68, which have received therein cylindrical posts 70 of a pair of upper work-engaging members or stabilizers 72.

The work-engaging members 72 comprise friction clamp devices 74 similar to the previously described friction clamp devices 40, 42 and including stationary clamping plates 76 rigid on the upper ends of the posts 70 and relatively movable clamp plates 78 which are angularly adjusted relative to the stationary clamp plates 76. The movable clamping plates may be retained in adjusted angular position by means of clamping screws 80. The clamping plates 76 and 78 of the frictional clamp device 74 have their opposing faces concaved, as shown most clearly in Fig. 3, and the opposing faces of the clamping plates 40 and 42 are likewise concaved to provide for slight inward springing of the plates when the respective clamping screws 44 and 80 are tightened to draw the plates into clamping engagement. This resilient springing of the clamping plates also serves to restrain the clamping screws 44, or 80, against accidental loosening and also to assure firm clamping engagement of the plates.

Figures 3, 4:
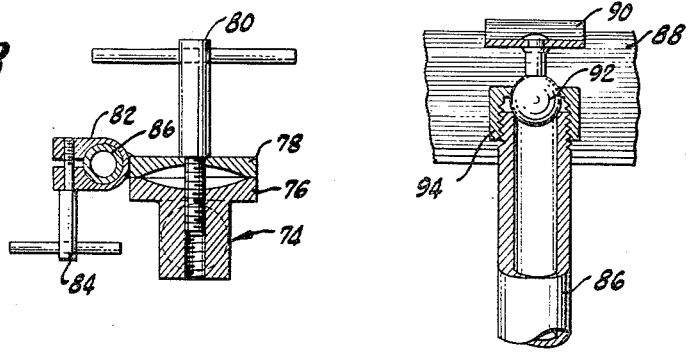
Fig. 3 is an enlarged section taken along line 3—3 of Fig. 2.
Fig. 4 is an enlarged section taken along line 4—4 of Fig. 2.

The rotatable clamping plates 78, of the frictional clamp devices 74, have split sleeves 82 welded to their peripheries, as shown in Fig. 3, the latter split sleeves having clamping screws 84 threaded therein for drawing the parts of the sleeves together. Received in the split sleeves 82 are cylindrical rods 86 which are adapted for axial adjustment in the sleeves and retention in axial adjusted positions by tightening of the clamping screws 84. A pair of V-section channels 88 are welded to the ends of a pair of straps 90 the other ends of which are attached to the balls 92 of a pair ball and socket couplings 94 carried at one end of the rods 86 to accommodate universal adjustment of the V-section channels 88 on their respective rods. Secured to the inner surfaces of the flanges of the latter channels are resilient work-engaging pads 96.

In use of the present work holding stand, a workpiece, such as an aircraft airfoil section, indicated in phantom lines at 98 in Figs. 1 and 2, is supported on the stand with its leading edge received in the yokes 46 and with the V-section channels 88 engaging over the trailing edge of the section. Said leading edge of the section bears on the resilient pads 61 of the yokes and the several stems 52 are adjusted in the bosses 50 of the yokes to bring the resilient pads 58 on the plates 56 into engagement with the side surfaces of the section, as shown in Fig. 2. The clamp screws 60 are tightened to retain the stems 52 in position and the friction clamp devices and the clamping screws of the split sockets associated with the yokes and stabilizers are tightened to retain the parts in desired position. Also, connectors 94 at the upper ends of the rods 86 are tightened to firmly retain the section 98 in working position. The yokes 46 support the weight of the section while the stabilizers comprising the rods 86 and V-section channels 88 retain the trailing edge of the section against lateral movement.

From Fig. 2 it will be seen, that by appropriate angular and vertical adjustment of the yokes 46 and stabilizers 86, 88 the aircraft section 98 may be supported in diverse working positions so as to accommodate holding of the section in an angular position most convenient to the operation to be performed. Adjustment of stems 52 in the bosses 50 enables the spacing between the yoke plates 56 to be varied in accordance with the thickness of the section, and vertical adjustment of the yokes and/or stabilizers and insertion or removal of the corner post extensions 62, enables the stand to be accommodated to aircraft sections having diverse widths. Also, the recessed sides of the frame 10, permit close approach of the worker to the section at either side thereof for convenient working thereon. While the stand has been described and illustrated with reference to the supporting of an airfoil section, it will be obvious that the stand may be employed for holding numerous other types of workpieces.

The present preferred embodiment of the present work holding stand, herein described and illustrated, is intended to be illustrative in nature, it being apparent that numerous modifications in design and arrangement of parts is possible within the scope of the following claims.

I claim:

1. A work holding stand for supporting an aircraft airfoil section in position to be worked on, comprising: an elongate main frame, a pair of generally V-shaped, first yokes for receiving the leading edge portion of the airfoil section, means mounting said yokes adjacent opposite ends of the frame with the yokes opening upwardly and aligned longitudinally of the frame, the divergent arms of each yoke being located in a transverse plane of the frame, a pair of longitudinally spaced, vertical posts on said frame, a pair of stabilizing rods, means mounting said rods on the upper ends of said posts for both axial adjustment of the rods and pivotal adjustment of the rods about transverse axes extending longitudinally of the frame, a second yoke at one end of each rod, means adjustably connecting each of said second yokes to its respective rod, said rods and second yokes being adjustable to position said latter yokes a variable distance above said first yokes with the second yokes opening downwardly toward the first yokes whereby an airfoil section may be supported on the stand with said first and second yokes engaging over the leading and trailing edges respectively of the section.

2. The subject matter of claim 1 including shafts extending perpendicularly through said divergent arms of each yoke, means connecting said shafts to their respective arms for axial adjustment of the shafts relative to their arms, work engaging pads on the inner ends of said shafts, universal connection means between said shafts and pads respectively, said pads being engageable with opposite sides of the leading edge portion of an airfoil section and being rockable relative to their respective shafts to conform to the curvature of said leading edge portion, and additional work engaging pads at the apices of said yokes for engaging the leading edge of the airfoil section.

3. A work holding stand for supporting an aircraft airfoil section in position to be worked on, comprising: an elongate main frame, a pair of first vertical posts mounted on the frame adjacent opposite ends of the latter, a pair of first yokes, means pivotally connecting the apex portions of said yokes to the upper ends of said posts for hinging of said yokes about a longitudinal axis of the frame, the divergent arms of each yoke being located in a transverse plane of the frame and said yokes being aligned longitudinally of the frame for receiving the leading edge portion of an airfoil section, a pair of second, vertical posts mounted at the side of the frame adjacent opposite ends of the latter, a stabilizing rod at the upper end of each second post, means connecting the rods and their respective posts for pivotal adjustment of the rods about transverse axes extending longitudinally of the frame and axial adjustment of the rods, a second yoke at one end of each rod for receiving the trailing edge portion of an airfoil section, universal connection means between each second yoke and its respective rod, said rods and second yokes being adjustable to position the latter yokes a variable distance from said first yokes with the second yokes opening toward said first yokes whereby an airfoil section may be held between said first and second yokes with the first and second yokes engaging over the leading and trailing edges respectively of the section, and said rods and yokes being angularly adjustable to permit holding of the section in various angular positions.

4. The subject matter of claim 3 wherein said posts are vertically adjustable to further vary the spacing between said first and second yokes.

References Cited in the file of this patent

UNITED STATES PATENTS

| | | |
|---|---|---|
| 1,323,127 | Treuhardt | Nov. 25, 1919 |
| 1,969,572 | Maurer | Aug. 7, 1934 |
| 2,019,789 | Mahannah | Nov. 5, 1935 |
| 2,453,046 | Sutton | Nov. 2, 1948 |
| 2,459,080 | Killius | Jan. 11, 1949 |
| 2,621,400 | Peterson | Dec. 16, 1952 |
| 2,669,958 | Sweeney | Feb. 23, 1954 |
| 2,680,287 | Wilson | June 8, 1954 |